(No Model.)
A. D. HOFFMAN.
SHAFT LUBRICATOR.
No. 508,222. Patented Nov. 7, 1893.
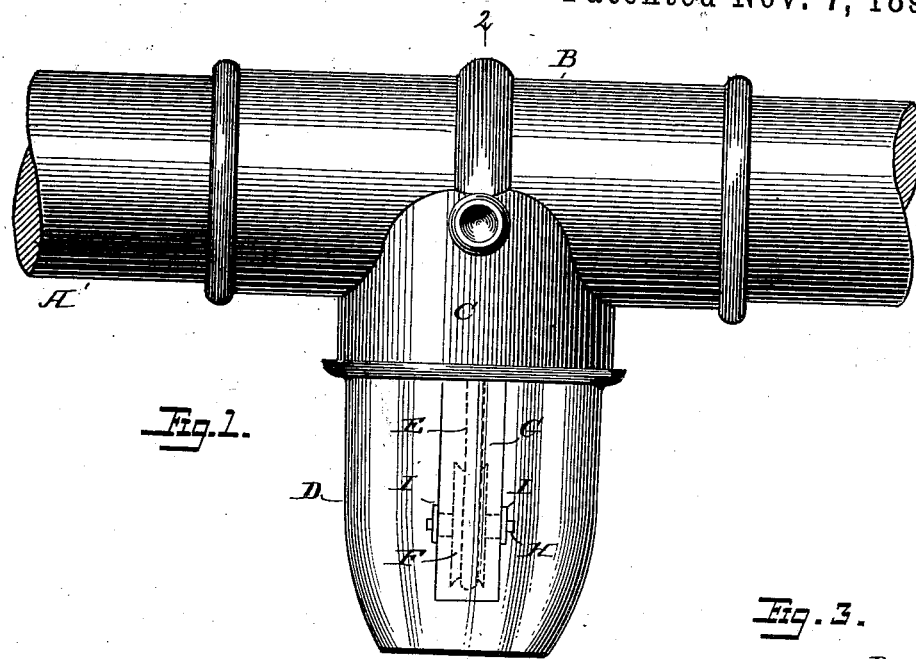
Fig. 1.
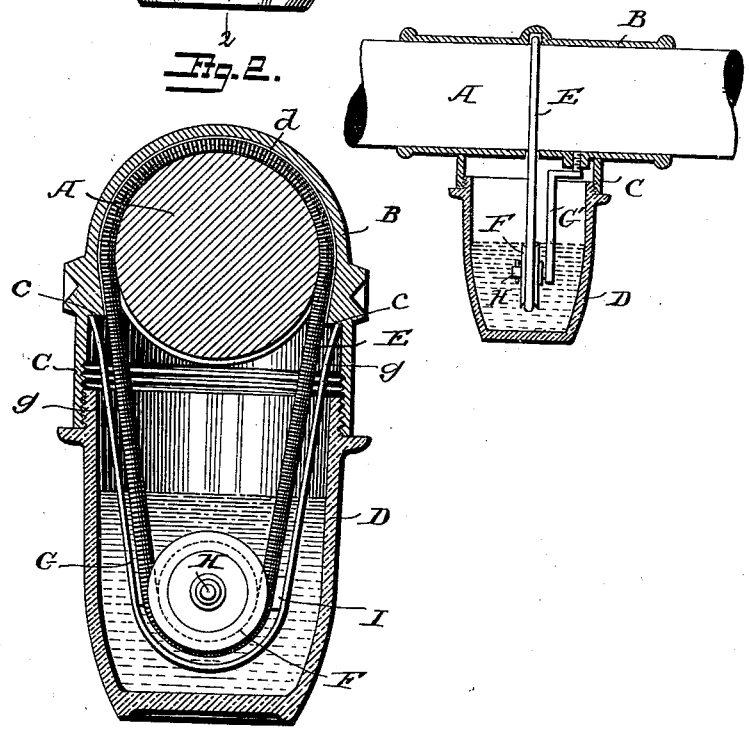
Fig. 2.
Fig. 3.
Witnesses
N. N. Low
Chas. W. Parker
Inventor
Austin D. Hoffman
by J. S. Barker
Attorney
THE NATIONAL LITHOGRAPHING COMPANY.
WASHINGTON, D. C.

UNITED STATES PATENT OFFICE.

AUSTIN D. HOFFMAN, OF MINNEAPOLIS, MINNESOTA, ASSIGNOR TO THE STANDARD SYNDICATE, OF MINNESOTA.

SHAFT-LUBRICATOR.

SPECIFICATION forming part of Letters Patent No. 508,222, dated November 7, 1893.

Application filed October 15, 1892. Serial No. 449,049. (No model.)

*To all whom it may concern:*

Be it known that I, AUSTIN D. HOFFMAN, a citizen of the United States, residing at Minneapolis, in the county of Hennepin and State of Minnesota, have invented certain new and useful Improvements in Shaft-Lubricators, of which the following is a specification.

My invention relates to shaft lubricators of that kind in which an endless band surrounds the shaft and extends into the oil receptacle, and by which the oil or other lubricant is conveyed to the bearing.

The invention consists in improvements in the construction and arrangement of the parts of the lubricating apparatus, and also in combination with such parts of an oil receptacle of transparent material into which they extend.

In the accompanying drawings, Figure 1 is a side view illustrating my invention. Fig. 2 is a vertical section on the line 2—2 of Fig. 1. Fig. 3 is a vertical section showing another form of my invention.

In the drawings, A represents the shaft, and B the bearing therefor, which may be of any usual or preferred construction. Formed with or secured to the lower side of the bearing there is a projection in the form of a boss or socket C to which is secured the cup-shaped oil receptacle D. This receptacle is made of transparent material, preferably of glass, so that the amount of oil therein may be seen, and the working of the parts of the lubricator observed from the outside, so that if any part of the apparatus fails to work satisfactorily this fact can be determined by the attendant by simply looking at the oil receptacle.

E represents an endless band which encircles the shaft and extends through a groove $d$ in the bearing and into the oil receptacle, it being sufficiently long to reach nearly to the bottom of the oil receptacle. It operates to convey oil or other lubricant from the receptacle to the bearing in the well known manner. I prefer that this endless band should be in the form of a closely coiled wire as such a band readily takes up the oil and conveys it to the bearing and at the same time has a degree of elasticity which is desirable. The band in practice is held under a certain amount of tension, its lower looped end passing around a wheel or pulley F situated in the lower portion of the oil receptacle. The wheel or pulley F is mounted so as to turn freely in a frame G which preferably consists of a U-shaped piece of metal the upper ends of the legs $g$ of which enter into the socket C and rest against the bearing faces $c$ on either side of the shaft bearing B. The upper ends of the legs preferably curve outward somewhat and they normally separate to such an extent that they have to be pressed toward each other slightly in order to enter the socket C. This enables the frame G to be detachably secured and yet held with sufficient degree of firmness. The wheel or pulley F turns loosely upon a shaft H which is removably placed or secured to two cross pieces I I situated between the legs $g$ of the frame near its lower end.

In using my invention the shaft is put in place with the band encircling it and extending through the slot $d$ in the bearing. The shaft H upon which the wheel or pulley F is mounted is then removed and the wheel adjusted upon the lower end of the band E when the shaft is again put in place holding the wheel in its supporting frame G. Owing to the flexibility of the encircling lubricating band this work can be done before the frame is inserted into the socket or boss C. After the frame has been put in place the oil receptacle can be filled and screwed into the socket or boss, when the parts are in position and ready for operation.

In the form of my invention shown in Fig. 3 the frame G' which carries the wheel H is of simple angular form instead of being U-shaped.

It will be seen that all of the parts of this lubricating apparatus are exceedingly simple, and yet are of such nature that they work effectively, and can be readily removed and replaced by other parts should this, from any cause, be desirable.

In Figs. 1 and 2 of the drawings is shown the preferred form of the bearing B, and by reference thereto it will be seen that the said bearing is formed of a single cylindrical piece of metal and has the open-ended boss C, integral therewith, the groove $d$, in which lies the encircling band E, being formed opposite to the open ended boss C. This makes a shaft bearing which is easy to cast, and which is especially adapted to have secured thereto an oil receptacle made of glass or other friable material.

Another important feature of my invention is the combination with a lubricating device of the character described, that is, having an encircling band, of an oil receptacle made of transparent material. It sometimes happens that an encircling band of the character described fails to operate, and this may continue for some considerable time before it is discovered if an oil receptacle of the usual kind is employed. But if such receptacle be of transparent material this is impossible, or practically impossible, because whenever the attendant looks at the oil receptacle he instantly perceives whether or not the parts of the lubricator are working properly.

By the use of my invention the amount of oil conveyed to the shaft can be increased or diminished by simply diminishing or increasing the tension upon the coil band E.

Having thus described my invention, what I claim, and desire to secure by Letters Patent, is—

1. The combination with a shaft, of a bearing therefor provided with a screw-threaded socket or boss C, a cup-shaped oil receptacle of transparent material provided with a screw thread by which it is adapted to be detachably secured to the said boss, and a band encircling the shaft and extending through a groove in the bearing and into the oil receptacle, substantially as set forth.

2. The combination with a shaft, of a bearing provided with a socket or boss C, the oil receptacle detachably secured to the said boss, the elastic band surrounding the shaft and extending into the oil receptacle, the detachable frame G having its legs entering into the said boss or socket C and extending thence into the oil receptacle, and the pulley or wheel mounted in the lower end of said frame upon a removable shaft, the said pulley forming a guide for the lower portion of the said band which encircles the shaft, substantially as set forth.

3. The combination with a shaft, of a bearing B therefor, formed of a single piece of tubular metal, from which projects the open ended boss C, and in which is formed the internal groove $d$ opposite the said boss, the oil receptacle adapted to be detachably secured to the said boss, and the band E which is adapted to lie in the groove $d$ and encircle the shaft, and to extend into the said oil receptacle, substantially as set forth.

In testimony whereof I affix my signature in presence of two witnesses.

AUSTIN D. HOFFMAN.

Witnesses:
H. M. FARNAM,
E. SISKRON.